United States Patent [19]

Stoeckert

[11] 3,876,925
[45] Apr. 8, 1975

[54] WIND TURBINE DRIVEN GENERATOR TO RECHARGE BATTERIES IN ELECTRIC VEHICLES

[76] Inventor: Christian Stoeckert, P.O. Box 993, Jetersville, Va. 23083

[22] Filed: Jan. 2, 1974

[21] Appl. No.: 430,048

[52] U.S. Cl. .......................... 322/1; 290/55; 180/65
[51] Int. Cl. ............................................. B60l 11/18
[58] Field of Search ............. 320/2, 61; 322/1, 100; 290/44, 55; 180/1 P, 60, 65

[56] References Cited
UNITED STATES PATENTS

| | | | |
|---|---|---|---|
| 1,152,666 | 9/1915 | Sterner | 290/44 X |
| 1,315,595 | 9/1919 | Clark | 290/55 |
| 1,571,303 | 2/1926 | Schafran | 290/44 |
| 3,621,930 | 11/1971 | Dutchak | 290/55 X |

Primary Examiner—J. D. Miller
Assistant Examiner—Robert J. Hickey

[57] ABSTRACT

In a wind turbine driven generator for the recharging of batteries utilized as the power source for various vehicles, and particularly an automotive electrically driven vehicle, the mechanical combination wherein wind driven vanes of particular design are mounted to rotate about a vertical shaft disposed in or on the roof of the vehicle, said vanes being completely enclosed within a suitable housing of either rectangular or circular configuration. When of rectangular shape the housing has at least four air current receiving openings, one on each side, each of which do in turn serve as exhaust outlets depending on direction of predominant air pressure, and, when of circular configuration, the housing has but one air current receiving vent, with that vent revolving to face the direction of any wind current by the impetus of a wind vane on the top thereof. In either case the arrangement is such that the said wind driven vanes rotate while the vehicle is under way, or, if air currents are prevalent, even while the vehicle is not in motion, thus to drive a suitably mounted generator for more or less continuous recharge of the battery system. Said generator is mounted within the hub around which said vanes rotate, and comprises a stationary stator, and rotating rotor, the latter being wind driven by the rotating vanes.

9 Claims, 5 Drawing Figures 3,876,925

WIND TURBINE DRIVEN GENERATOR TO RECHARGE BATTERIES IN ELECTRIC VEHICLES

BACKGROUND OF THE INVENTION AND PRIOR ART

As indicated in the foregoing Abstract, this invention relates to a novel wind turbine driven generator utilized for the recharging of batteries of various types of vehicles and particularly the batteries used in an electrically driven motor vehicle. The uniqueness of the invention resides in an arrangement wherein the forward motion of the electrically driven vehicle causes wind vanes of a particular scoop design to be driven by the current of air generated by such forward motion. More significantly, perhaps, is that in the instant case any prevalent wind current from any direction will cause the wind vanes to rotate and hence the generator which is driven by such vanes to produce an electrical current, the voltage of which is transmitted to the series of storage batteries which are utilized as the motive power for electric vehicles. In one instance, the air scoop arrangement of the invention including the generator located within the hub thereof, is permanently affixed on or within the roof of the vehicle; in the other instance, the device may be of a portable nature and thus adapted to be mounted upon, or removed from the roof, of the vehicle within the option of the operator. In the latter instance, the invention contemplates an enclosed air scoop and generator arrangement provided with a suitable wind vane which maintains the air scoop facing into the direction of the wind or air current.

In both cases, it is to be noted that generation of electrical energy occurs not only while the vehicle is in motion but also and, assuming there are prevalent wind currents, when the vehicle is not in motion. Where the wind current is even of a slight amount, this nevertheless results in at least a "trickle charge" being generated and so long as the wind prevails, that charge, even if it be of low voltage, will be fed into battery system for regenerative purposes. On the other hand, the arrangement of the invention is such that under conditions where a quartering or side wind velocity is greater than air flow or air velocity due to the motion of the vehicle, the air scoop arrangement still takes advantage of the higher force component, thus permitting the wind vanes to rotate and the generator to function to constantly cause air flow to the battery system.

There have been a number of ideas advanced, as exhibited by the prior art, which seek to achieve the same ultimate objective as here contemplated; however, these exhibit numerous disadvantages, as some are most complex mechanically in this regard, and more importantly, most involve mechanical combinations which are of such a nature that only the forward motion of the vehicle will actuate the type of propeller or other device which is used to in turn rotate the armature of a suitable electric generator. Among the prior art which is typical of such arrangements are the following U.S. Pat. Nos.: 2,941,613, 3,374,849, 3,444,946, 3,621,930 and 3,359,479.

Of these prior art items, the first four represent exactly that type of development referred to above: all describe proposed structures which are useful only in the sense that the generator is activated only by forward motion of the vehicle. Alternatively, if the vehicle remains stationary only the wind velocity headed directly into the forward end of the vehicle would produce any generation of electricity. Thus it is apparent that such devices are not adapted to take advantage of wind current forces from alternate directions, as the case with the present invention. Also, the type of vane or propeller used is of an inefficient design, such as to fail in overcoming electrical resistance of any generator, particularly at higher speed levels of the latter.

The remaining patent (U.S. Pat. No. 3,359,479) is representative of but a simple four-vaned wind receiving device, the reference pointing away from the instant invention by indicating that any more than four of such vanes will produce "aerodynamic interference." In the instant case, some dozen or more wind scoops may be effectively utilized. This prior art item further involved an additional and severe disadvantage — the latter resides in the fact that there is absent the cover structure used in both versions of the instant invention. Yet it is this latter structure, with one or more outlets for the reception of a wind component or force, that permits the novel combination of the instant invention to effectively utilize wind or air force no matter from which direction it emanates. Indeed, in the instant case even where there is a prevalent high wind velocity from the rear, the scoop arrangement would function even if the vehicle be in forward motion, this provided that the force component from the rear be larger than the force component from the forward area.

In any event, with regard to all of this prior art, it is thus evident that none of the same illustrates a combination wherein firstly, a wind or air force component from whatever direction can be utilized to drive the scoops and in turn drive the generator and, secondly, none of this prior art, in conjunction with the last named advantage exhibits any arrangement of inlet and outlet, together with the unique scoop design, that advantageously utilizes the hydraulic ram principle to thus maximize impact force upon the turbine blades. In this latter respect, my invention encompasses a fundamental design principle — use of what might be termed a horn-shaped type of inlet or inlets in conjunction with an opposing outlet or air exit, and this with regard to a completely enclosed wind turbine. The entire combination thus emphasizes the "hydraulic ram" principle, the result being far greater efficiency and effectiveness in the production of electrical energy via generator drive, than any of the designs heretofore exhibited by the prior art, and as such is exemplified in the foregoing.

OBJECTS OF THE INVENTION

It is accordingly a primary object of the instant invention to provide a wind turbine generator for use with regard to any type of vehicle but particularly electric automotive vehicles wherein the force of prevalent air currents, no matter from what direction, and whether the vehicle is in motion or not, are utilized to more or less continuously rotate the armature of a suitable generating device to produce electrical energy and feed that voltage, even if in slight increments, back to the battery source commonly used to drive motor vehicles having electrical motor means.

It is another object of the invention to provide a device of the nature briefly referred to above which can be permanently installed in the roof of such vehicles as an automotive vehicle, electrically driven, or can be in optional form of portable type to be emplaced upon a roof of an already fabricated electric vehicle without undue convenience and of course without substantial body alteration of such vehicle.

Another object of the invention is to provide a wind turbine generator means for the storage battery means of an electric vehicle wherein in one form thereof the wind vanes, of scoop design, are entirely enclosed within a suitable housing, such housing being or rectangular configuration and having at least four inlets and four outlets such that the scoop, and the vane members receive wind currents no matter from what direction the air force might emanate, thus to permit rotation of the armature of a suitable generator means and whether the vehicle is in motion or not and provided only that there be available prevelent air currents. In other words, with regard to this objective of the invention, the vaned element will be rotated from whatever direction the higher component of wind velocity or force is generated, and this, whether the vehicle is in motion or not. Obviously, if the vehicle is in motion the greater wind force will more generally than not be from the front end.

It is a further objective of the invention to provide as an alternate embodiment thereof a rotating turret within which the entire scoop, vaned arrangement and generator means is located, the same being portable in nature, that is, mountable on and demountable from the roof top at the desire of the operator. In this regard, this rotatable turret is provided with a wind vane such that the appropriate air inlet in the turret will constantly face into the direction of the wind, and this again, whether or not the vehicle is in motion.

Finally, it is a most fundamental objective and advantage of the invention to provide a design of the simplest sort, without complex moving parts or complicated mechanical structure; here the invention particularly departs from the prior art and with regard to such schemes as advanced by the patents above noted where, to fulfill the sole aim of such designs, the involved pantentees have proposed structures so complex in nature that to actually fabricate such devices would call for, in many instances, a redesign of the entire vehicle, this at great and unwarranted expense. With regard to my invention, and in contrast, cost of fabrication, by the simplicity of the arrangement thereof, is minimal, thus to permit of installation or fabrication of the unit at low and reasonable expense to the consumer.

DESCRIPTION OF DRAWINGS

The appended drawings depict not only the manner of construction of the devices of my invention but also graphically illustrate the use thereof in two ways (the two preferred embodiments) which have been above briefly mentioned. Referring more particularly thereto.

MORE DETAILED DESCRIPTION OF THE INVENTION

Figure 1:
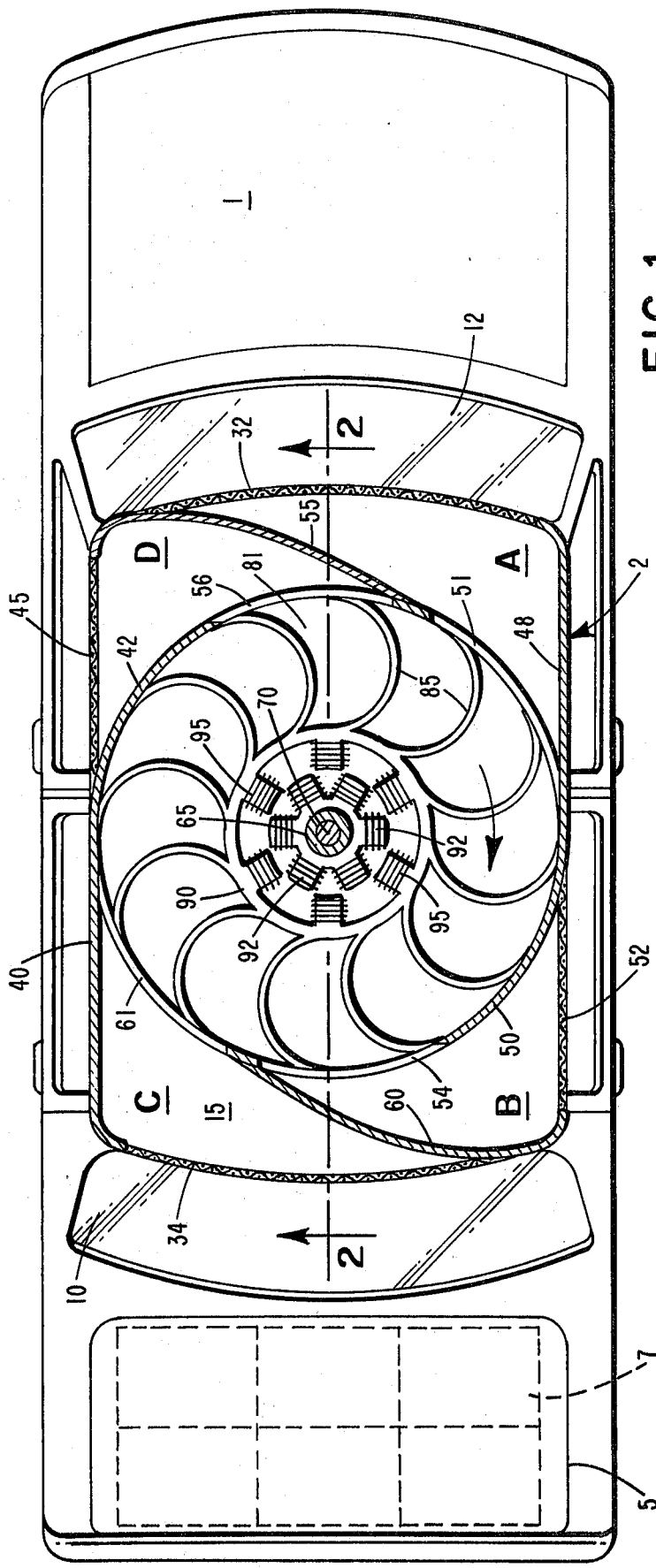
FIG. 1 is a top plan view, partially in section, of one preferred embodiment of the invention illustrating the same mounted in a permanent fashion in or upon the roof of an electrically driven motor vehicle, and also particularly illustrating not only the scoop design of the vaned arrangement, but also the inlet and outlet ports which materially contribute to the desired "ram effect" conducive to superior efficiency. Also the generating means is depicted as being located within the hub portion of this type of vaned construction, a feature common to both embodiments.
Figure 2:
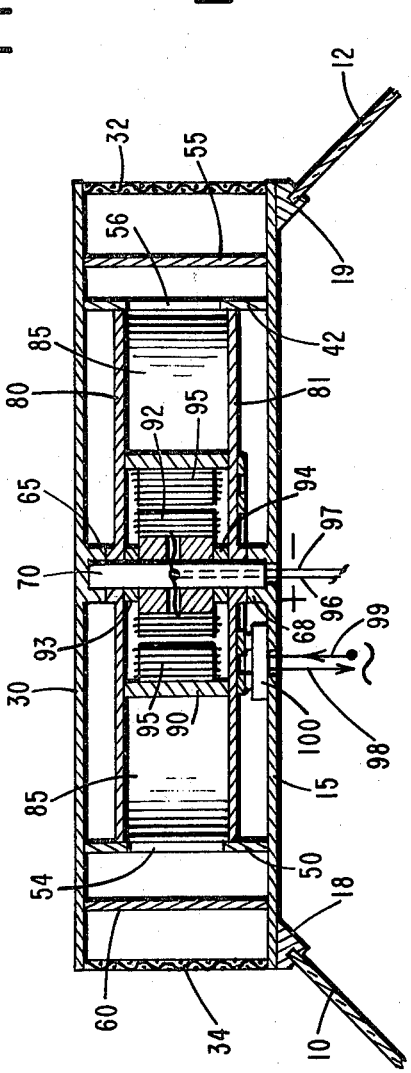
FIG. 2 is a section view of the invention taken on the line 2—2 of FIG. 1.

The first embodiment of my invention is represented in FIGS. 1 and 2 and reference thereto will first be made.

A vehicle body of usual design is generally indicated at 1. The enclosure for the moving elements represented particularly by the wind vane, turbine arrangement, are enclosed within a housing generally indicated at 2. Such housing is shown as being emplaced upon or in the upper portion of the roof of the given vehicle. In the instant case and as indicated, the vehicle is electrically driven and to this end a battery housing 5 is provided with which a series of storage batteries 7 are located.

It will be seen, viewing FIG. 1, that there are four air inlets in the housing 2 and also, as will be described below, four complementary exit or air outlets. These combined air inlet and otlet arrangements are separately indicated at A, B, C and D and represent respectively, the right forward air inlet-outlet, the right rear inlet-outlet, the left rear inlet-outlet and the left forward inlet-outlet (viewing FIG. 1). Each of these is of like design, in that all of them represent an air scoop of more or less "horn" design in that the entering space is larger than the exit area so that the referred to "ram" effect is obtained by acceleration of velocity of the air as it approaches the vanes of the provided turbine.

Thus, referring first to the right forward air inlet-outlet A (again FIG. 1), the front of the casing is provided with an air permeable member 32 such as a screen fitted between the curved metal portion 55 having an air inlet opening 51, and a lower (viewing FIG. 1), metal plate 48. This latter plate is also curved at its rear end to fit the shape of the turbine which it there encloses, such plate also being provided with an opening 54 which represents the second of the air inlet openings.

Thus the second air inlet-outlet assembly B similarly comprises a screen element 52 fitted in between the side member 48 and a metal plate 60 which is similar in configuration to that of the forward scoop but of course reversely mounted because of its rear portion. This element 60 terminates with an appropriate opening 61 representing an air inlet-exit point for air entering the second air inlet 52. Here again the "horn" design is followed with the same result of increase in velocity of air from entrance point to exit point at exit 54.

The left rear of the housing comprises another screen element 34 which is of the same design as the forward element 32 but of course oppositely located with regard to the latter. This screen element 34 represents the rear air inlet-exit opening, the scoop design of same again being represented by the letter C. Such air scoop thus comprises screen element 34, the curved plate 60, and on the left side of the vehicle (or viewing FIG. 1, the left upper side), the plate 40 which along half its length is parallel to plate 48 and towards its forward end is again curved to fit the configuration of the turbine which it encloses and as indicated at 42. The air inlet-outlet opening in plate or member 60 is represented by the numeral 61.

Finally, the air scoop and air exit design D, or that one positioned at the left front portion of the housing, again comprises an air inlet opening 45 consisting again of screening, and the curved portion 42 of plate 40, and further, the forward plate 55. The curved portion of plate 40, namely 42, terminates at a point short of the center line of the vehicle to again leave an opening 56 which is representative of the air outlet opening for air entering through screen 45 at the left front portion of the housing.

This entire housing structure, referring to FIG. 2, is affixed to the roof of the vehicle, represented by the rear roof portion 10 and the forward roof portion 12, and by any suitable means such as that indicated at 18 and 19 respectively, the latter consisting of slot formations within which these roof segments 10 and 12 interfit and within which they can be securely affixed as by welding, etc. Obviously, the side portions of the roof, although not here shown, are fabricated to be affixed to the housing in the same fashion or in any other suitable manner that would be known to those skilled in the art.

The turbine mechanism is completely enclosed within this housing and to this end same is provided with a bottom plate 15 and an upper plate 30 (see FIG. 2), with the forward and aft screen portions 32 and 34 also being indicated in this figure.

The upper plate 30 is provided with a central hub 65 and the lower plate 15 also provided with a central hub 68, each of these hubs having a central bore (as indicated) such as to receive a pin or shaft 70 upon which the vaned rotor is rotatably mounted. The pin 70 is itself stationary, and thus affixed in any suitable manner to the bores in each of the hubs 65 and 68.

The rotor vanes, indicated at 85, are positioned within and affixed to upper plate 80 and the lower plate 81, these vanes and said plates 80, 81 rotating about the shaft 70. The rotor assembly is thus independently and completely closed except for the peripheral area of the rotor blades 85.

Such vanes 85 are of a scoop design in the sense that in cross section, and as clearly shown in FIG. 1, they represent approximately one half of a circular configuration. In the embodiment here shown there are twelve of such scoops 85, these comprising this rotor drive assembly.

Such scoops 85 are formed upon an interior hub 90 of circular configuration. This hub forms the rotor portion of the generator means, such being represented by the windings 95, these windings in turn being formed upon suitable interiorly directed radial extensions formed upon the hub 90 and as also shown in FIG. 1.

Again referring to this figure, the stator of the generator means is represented at 92. This stator comprises a series of complementary windings, that is complementary to those of the rotor indicated at 95. The stator is permanently affixed to the shaft 70. Suitable spaces, washers or antifriction bearings 93 and 94, can be located on each side of the stator element to provide free rotation of the rotating vane means.

From the foregoing, it is seen that the generating means is built within and forms a part of the rotatable, vaned system. As indicated in FIG. 2, current is applied to the stator windings from the battery means through lines 96 and 97 to create an electrical or magnetic field which is broken intermittently upon rotation of the windings on the hub 90, thus to generate an electrical current. The produced voltage is transmitted through lines 98 and 99, as shown in FIG. 2, and through such known mechanism as suitable armature or collector rings, generally and only graphically indicated at 100. Thus upon rotation of the vaned arrangement responsive to flow of air from any direction an alternating current is produced as graphically illustrated via the mechanism shown in FIG. 2. Being alternating current, the same would have to be rectified to direct current through such usual means (not shown) as known transistorized rectification circuitry.

On the other hand, as is well known to the art, if the successive coils 95 of the rotor are wound in alternate directions then the generated current would necessarily flow in the same direction and such would be in the first instance direct current suitable for recharging purposes. Again any "ripple" in this DC flow of current can be removed, if necessary, by known electronic media so that a pure DC flow of voltage is fed directly to the storage battery system to regenerate the latter. Also, as is usual in any charging device and as is known to the art, it may be desirable to provide a voltage regulator having a cut-out means or equivalent to prevent flow of current at points of peak output to assure that the battery system is not overcharged. All such means are well known to those skilled in the art and need not be further explained here.

The peculiar design of the "horn" shaped inlets together with the particular design of the shape of each of the rotor vanes in combination assures peak performance so far as drive of the involved generator means be concerned. Such combined arrangement is here of importance for it is appreciated that with increased speed of the generator rotor there is an increased electrical resistance to rotation and hence every incremental amount of wind energy that is available must be efficiently utilized to achieve the purposes of the invention. In the instant case, this improved combination is intended to more efficiently convert wind energy to electrical energy, and far more so than any of the prior art attempts to do so in the past and as such are represented by the prior art items generally summarized in the beginning of this Specification As a matter of fact, the system of my invention represents a vast improvement over the simple wind vane of U.S. Pat. No. 3,359,479, for, even if subject to rotation by wind from any direction, that device would be more or less totally ineffective for the purposes of this invention because of its great inefficiency, this in turn resulting from the design of the rotor there shown. The latter is not enclosed in a suitable casing, etc., would have a power output which would be negligible, and thus in fact incapable of overcoming the increased electrical resistance of the generator means at higher speeds thereof, and as mentioned in the foregoing.

Figure 3:
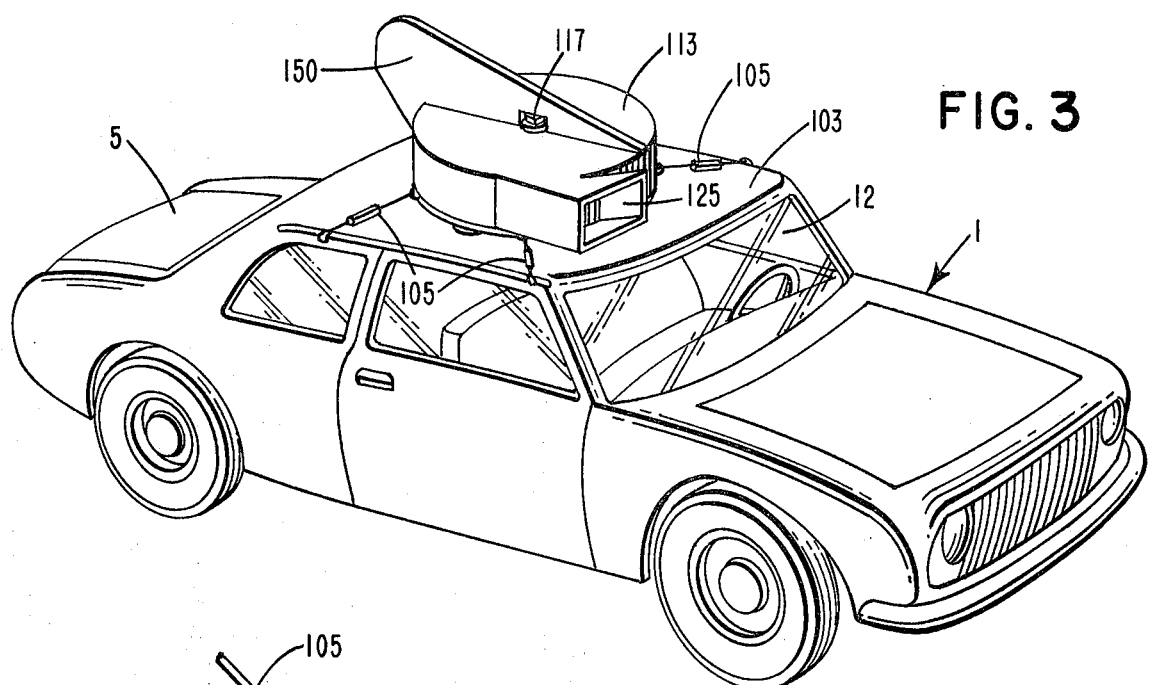
FIG. 3 depicts an alternate version of the invention wherein the same is of a portable type, utilizing a circular turret which is adapted to be turned by the force of the wind with the throat or opening of that turret resultantly being directed towards the air current, no matter from what direction.
Figure 4:
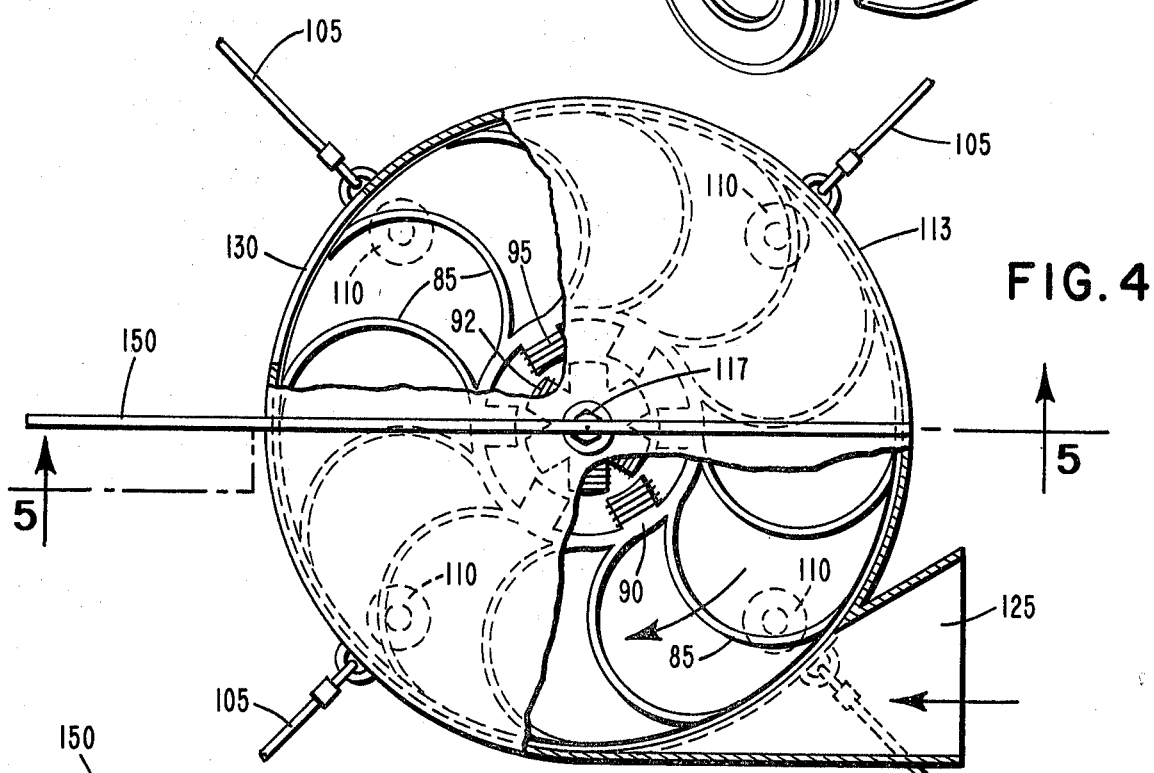
FIG. 4 is a top plan view, partially in section, of the alternate embodiment of the invention, and as same is illustrated in FIG. 3.
Figure 5:
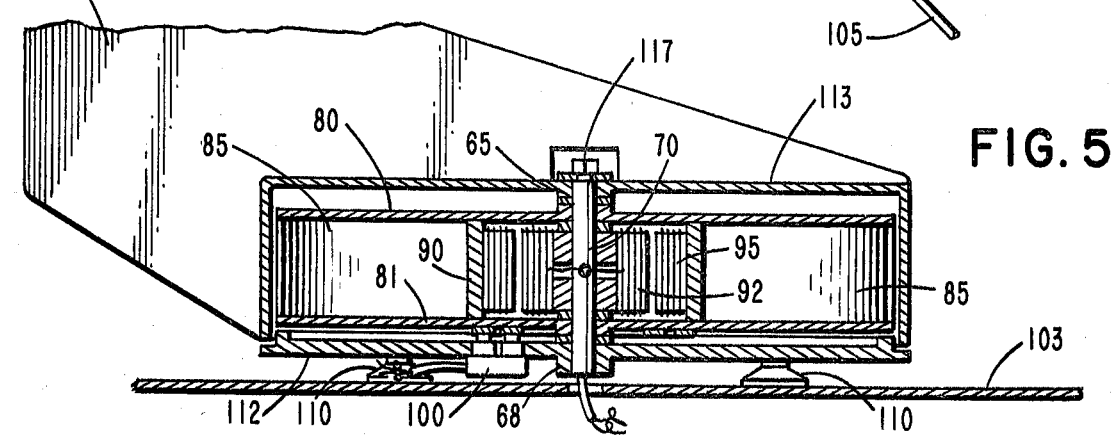
FIG. 5 is a section view of the invention taken on the line 5—5 of FIG. 4.

The second embodiment or version of this invention is shown in FIGS. 3 to 5 inclusive. Insofar as the rotor vane arrangement, generator, stator and rotor coils, etc., be concerned, the mechanical elements thereof are the same as shown in FIGS. 1 and 2. Therefore, like numerals as to like parts of the combination are applied in these FIGS. 3 to 5.

The main difference between this version of the invention and that shown in FIGS. 1 and 2 is that in the second embodiment thereof the wind vane drive for the generator assembly is shown emplaced in a housing which is portable, or mountable and demountable, with respect to the roof or top portion of a given electrically driven vehicle. Also in this alternate of the invention there is only one air inlet and one air outlet, but with the latter, by a suitable wind vane, forced to face in the direction of the wind source.

In this version of the invention this portable assembly is mounted upon the top 103 of the usual form of vehicle. The turret or casing 113 for the entire unit is fixed to the automobile via the usual type of turnbuckle-hook arrangements, such as generally depicted at 105, and such being common to the art as for example, the tie-down of a luggage carrier upon the top of any automobile.

As stated, the housing 113 in this version of the invention is rotatable; obviously the rotor represented by the vanes 85 is also rotatable. Therefore and with particular reference to FIG. 5, the shaft 70 is fixed at only one point, and this via a suitable pin through the said shaft and the hub 68, which latter is in turn made integral with the bottom and stationary plate 112. Thus the housing 113 is permitted to turn and of course the rotor itself permitting to rotate, both being in rotatable relationship with regard to the fixed pin or shaft 70. This bottom plate 112, also of circular configuration to match that of the housing 113 and as shown in FIG. 5, is of course stationary with respect to both the rotor and the rotor housing and is secured to the top of the vehicle via any usual means such as the turnbuckle assemblies 105 or other usual form of attachment. It rests upon a series of four stanchions or support members 110 and as shown in FIGS. 4 and 5. The assembly of rotor and casing are held in the position shown in FIG. 5 by a usual bolt means 117 threaded into an appropriate threaded bore in the upper end of shaft 70.

Also in this embodiment of the invention, the circular housing 113 is of such a diameter as to encompass, within reasonable tolerance, the diameter of the rotor as represented by the extremities of the rotor blades or vanes 85.

Further, and as stated, in this version of the invention there is only one inlet 125 and one air exit 130. The air inlet, and as shown in FIG. 4, again comprises a scoop configuration 125, and the air exit, approximately diametrically opposed from the inlet, is represented by an opening 130 cut into the wall of the casing 113.

As shown in FIG. 3 the air inlet 125 is facing the forward end of the vehicle and, presuming the vehicle to be in motion and no component wind forces from another direction, the air inlet is located forwardly because of the air current directed against the wind vane 150. The latter is positioned on top of the casing 113. This vane 150 has a configuration approximate to that as shown in FIG. 3; however, its shape and relative size may be of any sort so long as it performs the function of rotating this turret-type casing 113 into the direction of the wind, or in other words, in that direction where the air inlet faces the oncoming wind force. Accordingly, if the vehicle be at a standstill with no forward motion but there be prevalent air currents, the same would rotate the turret or casing 113 via the vane 150 in a direction to point the inlet 125 directly into the prevalent air current. Manifestly, the result is in any event to force rotation of vanes 85 in a clockwise direction and this whether the vehicle be in motion or at a standstill. Any vane rotation will of course result in the generation of electrical current for ultimate output to the battery system and as explained above, even if the vehicle is not in motion. In other words, where there are prevalent wind currents, and no matter from what direction, there will be an incremental amount of voltage delivered to the battery system for charging purposes.

It is thus in these respects that the involved invention so vastly differs from the schemes of other adventurers in the art and simply in this: that the generation of electricity does not solely depend upon forward motion of the vehicle but can occur under conditions of wind velocity while the vehicle is not in motion. Furthermore and again unlike the ideas of others in the art, actuation of the wind vane rotor system is not dependent simply upon forward motion of the automobile but upon the more important factor of wind velocity as a component air force from any direction whatsoever. Thus, as indicated above, if the vehicle were travelling at 30 miles per hour forwardly and there were either a side or quarterly wind velocity substantially in excess of that amount the latter would prevail with an overcoming force component which would turn the vaned rotor irrespective of the lesser velocity of the air force directed toward the front of the vehicle. Also, it is visualized that in the motion of any vehicle at higher or even medium speeds and despite the modern body designs of same, there is developed in the rear of the vehicle a space of low air pressure or vacuum, much in the sense that an aircraft wing is so designed that low pressure above the wing lifts the aircraft, not the air current prevalent beneath the wing. As a development following this theory in the application of the instant invention, it is thus apparent that any forward or side air current entering, for example, the areas A, B and D of the vehicle as shown in FIG. 1, will be substantially aided in their respective velocities by the development of lower air pressure which may exist in rear area C, thus to substantially increase the efficiency of the entire unit in the sense of greater velocity of the turbine or greater thrust upon the turbine blades, and under these operating conditions.

Although other alternates and substitutes may be made without departing from the spirit of the invention, it is to be understood that the scope thereof is to be measured only by the limitations of the several claims appended hereto.

I claim:

1. In a wind driven turbine generator to recharge the batteries of an electric vehicle the combination comprising a rotatable wind driven rotor means, said means being mounted upon a stationary vertical shaft, said rotor means having a series of laterally disposed rotor blades approximately semicircular in cross-sectional configuration mounted for rotation on said shaft, a housing mounted upon the roof of said electric vehicle for enclosure of said rotor means, said housing being rectangular and having at least one air inlet and outlet means on each side thereof to receive and discharge air currents from more than one direction, said inlet and outlet means being in communication with said laterally disposed rotor blades, a generator means within said housing, said generator means comprising a rotor winding and a stator winding, said stator winding being mounted upon said shaft and concentrically with respect to said rotor blades, said rotor winding being in fixed interconnection with said rotor blades to rotate therewith about said stator winding, and electrical circuitry means interconnecting the voltage output of said generator to said batteries during rotation of said rotor blades.

2. The invention as defined in claim 1 wherein each of said inlet openings is of a horn-shaped scoop design with the wider portion thereof being adjacent the casing wall and the narrower portion thereof being adjacent said rotor means.

3. The invention as defined in claim 1 wherein said generator means comprises a stationary shaft, said rotor means having a hub rotatably about said shaft, a series of stator windings and a series of rotor windings, said stator windings being disposed on said shaft, said rotor windings being disposed upon said hub, and circuitry means in interconnection with said rotor windings to feed current produced thereby to said batteries.

4. The invention as defined in claim 3 wherein said rotor windings are successively wound in opposite directions to thereby produce direct current for transmission to said batteries.

5. In a wind driven turbine generator to recharge the batteries of an electric vehicle the combination comprising a rotatable wind driven rotor means, said means being mounted upon a stationary vertical shaft, said rotor means having a series of laterally disposed rotor blades approximately semicircular in cross-sectional configuration mounted for rotation on said shaft, a housing for enclosure of said rotor means, said housing being provided with one air inlet duct at the forward end thereof and an oppositely positioned air exit opening, said housing being rotatably mounted with respect to the top of said electric vehicle, and wind vane means interconnected to the exterior of said housing to rotate said housing responsive to air current to constantly maintain said inlet opening facing the direction of air current, a generator means within said housing, said generator means comprising a rotor winding and a stator winding, said stator winding being mounted upon said shaft and concentrically with respect to said rotor blades, said rotor winding being in fixed interconnection with said rotor blades to rotate therewith about said stator winding, and electrical circuitry means interconnecting the voltage output of said generator to said batteries during rotation of said rotor blades.

6. In a wind driven turbine generator to recharge the batteries of an electric vehicle the combination comprising a rotatable wind driven rotor means, said means being mounted upon a sationary vertical shaft, said rotor means having a series of laterally disposed rotor blades approximately semicircular in cross-sectional configuration mounted for rotation on said shaft, a housing for enclosure of said rotor means, said housing being rotatably mounted upon the roof of said vehicle, there being one air inlet and one air outlet in said housing, and wind vane on the top of said housing, said wind vane being adapted to turn said housing responsive to wind direction so that said inlet constantly faces into said wind, a generator means within said housing, said generator means comprising a rotor winding and a stator winding, said stator winding being mounted upon said shaft and concentrically with respect to said rotor blades, said rotor winding being in fixed interconnection with said rotor blades to rotate therewith about said stator winding, and electrical circuitry means interconnecting the voltage output of said generator to said batteries during rotation of said rotor blades.

7. The invention as defined in claim 6 wherein said inlet opening is of a horn-shaped scoop design with the wider portion thereof being adjacent the casing wall and the narrower portion thereof being adjacent said rotor means.

8. The invention as defined in claim 7 wherein said generator means comprises a stationary shaft, said rotor means having a hub rotatably about said shaft, a series of stator windings and a series of rotor windings, said stator windings being disposed on said shaft, said rotor windings being disposed upon said hub, and circuitry means in interconnection with said rotor windings to feed current produced thereby to said batteries.

9. The invention as defined in claim 8 wherein said rotor windings are successively wound in opposite directions to thereby produce direct current for transmission to said batteries.

* * * * *